(No Model.)
P. THACHER.
BELT FASTENER.
No. 495,439.  Patented Apr. 11, 1893.
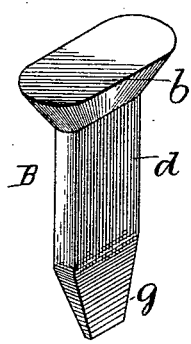
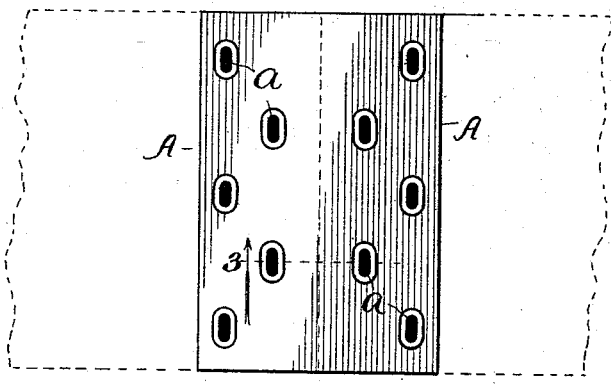
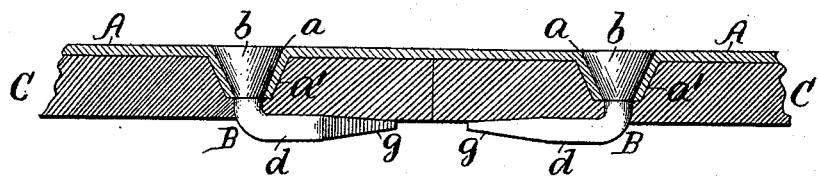
Witnesses:
Inventor:
Peter Thacher.
By S. B. Coupland & Co
Attys

UNITED STATES PATENT OFFICE.

PETER THACHER, OF CHICAGO, ILLINOIS, ASSIGNOR OF ONE-HALF TO EDWIN E. HOOPER, OF SAME PLACE.

BELT-FASTENER.

SPECIFICATION forming part of Letters Patent No. 495,439, dated April 11, 1893.

Application filed October 8, 1892. Serial No. 448,249. (No model.)

*To all whom it may concern:*

Be it known that I, PETER THACHER, a citizen of the United States, residing at Chicago, in the county of Cook and State of Illinois, have invented certain new and useful Improvements in Belt-Fasteners; and I do hereby declare the following to be a full, clear, and exact description of the invention, such as will enable others skilled in the art to which it appertains to make and use the same.

This invention relates to improvements in belt-fasteners, and consists of certain novel features, as will be hereinafter set forth.

Figure 1 is a view in perspective of one of the fastening-rivets; Fig. 2, a plan of a connecting-plate, the broken-away ends of a belt being indicated in dotted lines; and Fig. 3, a broken-away section on line 3, Fig. 2, looking in the direction indicated by the arrow.

In the drawings, A is a connecting-plate, preferably of metal, B one of the rivets (greatly exaggerated) used in securing the plate to the joining ends of the belt, and C C the respective ends of the belt. The connecting-plate is provided with a number of elongated apertures, $a$, and a correspondingly shaped socket projection, $a'$, having inclined contracted sides, as shown in Fig. 3, and which are forced into and firmly embedded in the belt so as to take some of the strain off from the rivets and prevent all possibility of the ends of the belt drawing apart. The heads, $b$, of the rivets are beveled and of a shape corresponding to that of the socket projections, and wedge closely into place and are countersunk when the ends of the rivets are clinched on the opposite side, as illustrated. These rivets are inserted from the top, or plate side of the belt, and extend entirely through the plate and belt, and are clinched down by suitable tools on the under or inner side of the belt. The body, $d$, of the rivets is elongated in cross section, and the driving end, $g$, wedge-shaped; the rivets being inserted and turned down flatwise with reference to the longitudinal dimensions of the belt and lie closely thereto.

The belt plate may be provided with countersunk seats which embed into the material of any other shape than that shown, but the present form is preferred. By this arrangement the belt-plate is easily removed and if any of the rivets are broken they can be replaced, which is not the case where the rivets are rigidly an integral part of the plate, as when one or more are broken off the plate is useless.

Having thus described my invention, what I claim as new, and desire to secure by Letters Patent, is—

A belt fastening consisting of a metallic plate having tapering socket projections elongated in a direction transverse to the belt and extending from its lower face, said socket projections having tapered elongated openings extending through the plate and socket, the outer upper end of said opening being largest, and fastening rivets having heads and bodies corresponding to the said openings in the plate, and having points which extend through the attached belt and clinch below the same, all substantially as described.

In testimony whereof I affix my signature in presence of two witnesses.

PETER THACHER.

Witnesses:
L. M. FREEMAN,
L. B. COUPLAND.